Jan. 13, 1970 R. D. OGG 3,489,005
MARINE SPEEDOMETER
Filed Oct. 21, 1968
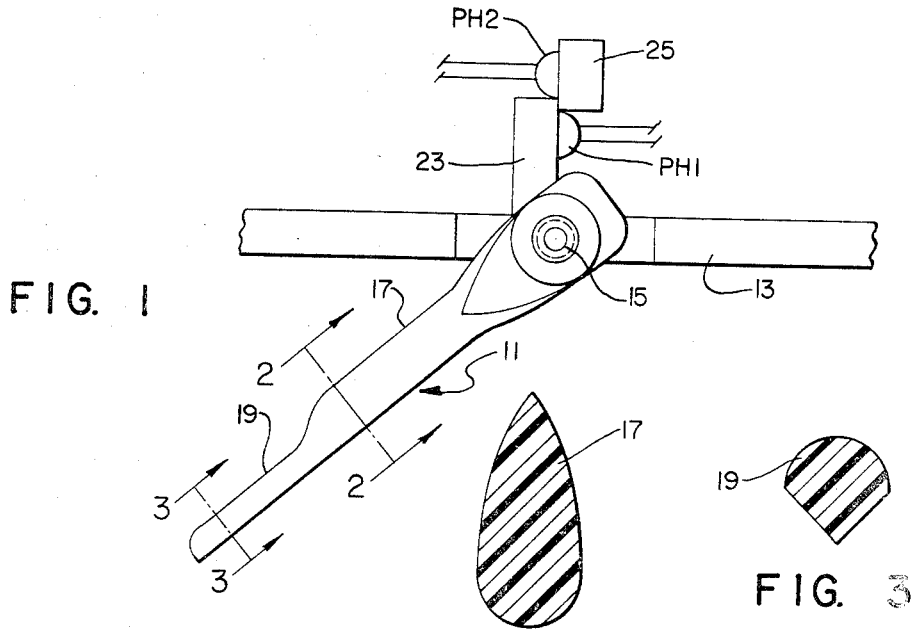
FIG. 1
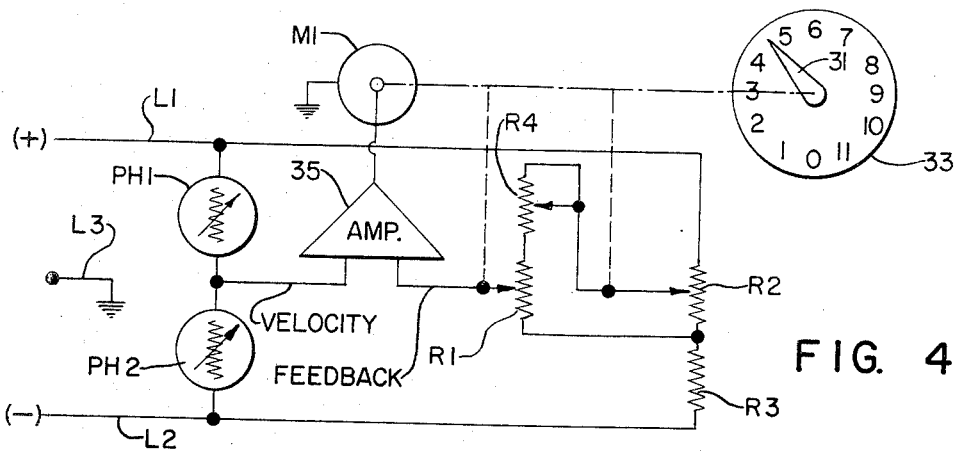
FIG. 2  FIG. 3
FIG. 4
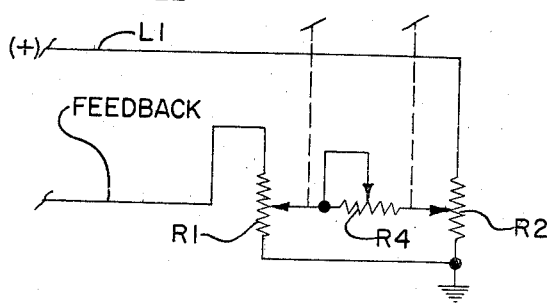
FIG. 5
INVENTOR
Robert D. Ogg
BY
Kenway, Jenney & Hildreth
ATTORNEYS

United States Patent Office

3,489,005
Patented Jan. 13, 1970

3,489,005
MARINE SPEEDOMETER
Robert D. Ogg, North Windham, Maine, assignor to The Eastern Company, Naugatuck, Conn., a corporation of Connecticut
Filed Oct. 21, 1968, Ser. No. 769,331
Int. Cl. G01c 2/10
U.S. Cl. 73—186                                    7 Claims

ABSTRACT OF THE DISCLOSURE

The marine speedometer disclosed employs a speed sensor or transducer providing a velocity signal which varies as a non-integer exponential function of relative fluid velocity, e.g. having an exponent of 1.85, and yet provides a linearly varying speed indication which is relatively easily comprehended. Linearization of the sensor velocity signal is provided by means of a pair of linear potentiometers which are driven by a servomotor which also drives the indicator. The potentiometers are interconnected with a coupling resistance in such a way that the extent to which the potentiometers operate successively varies as a function as the value of the coupling resistance. The potentiometers thus provide a feedback signal which varies substantially as a non-integer exponential function of the displacement of the servomotor, which function closely approximates the velocity signal characteristic, so that the servomotor may be energized in a feedback loop to provide an indicator displacement which is a substantial linear function of fluid velocity.

BACKGROUND OF THE INVENTION

This invention relates to marine speedometers and more particularly to such a speedometer which provides a linearly calibrated indication of relative fluid velocity.

My copending application Ser. No. 766,253, filed Oct. 9, 1968 and entitled Marine Speedometer (file 159A) discloses a novel marine speed-sensing strut which is highly advantageous in that it is not prone to either vertical or lateral vibration. This sensor, however, provides a velocity signal which varies as a non-integer exponential function of relative fluid velocity. In the preferred embodiment, the exponent of this characteristic output function is approximately 1.85, that is a value between 1 and 2.

Amony the several objects of the present invention may be noted the provision of a highly accurate marine speedometer which employs a hydrodynamic transducer providing a velocity signal which varies as an exponential function of relative fluid velocity, the exponential of the function being between 1 and 2, and which yet provides a linearly calibrated indication of speed. Further objects include the provision of such a speedometer which responds quickly and which is accurate, reliable and relatively inexpensive. Other objects and features will be in part apparent and in part pointed out hereinafter.

SUMMARY OF THE INVENTION

Briefly, a marine speedometer according to this invention employs a hydrodynamic transducer providing a velocity signal which varies as an exponential function of relative fluid velocity, the exponent of the function being between 1 and 2. A servomotor is provided for driving a linearly calibrated speed indicator. First and second linear potentiometers are also driven by the servomotor. The potentiometers are interconnected with a coupling resistance of preselectable value in a circuit wherein the extend to which the potentiometers operate successively is variable as a function of the value of the coupling resistance. The circuit thus provides a feedback signal which varies substantially as an exponential function of the displacement of servomotor, which function closely approximates the velocity signal function which is characteristic of the transducer. A differential amplifier selectively energizes the servomotor as a function of the relative values of the velocity and feedback signals thereby causing the displacement of the servomotor to be varied as a substantially linear function of relative fluid velocity.

BRIEF DESCRIPTION OF THE DRAWINGS

FIG. 1 is a side view, with parts broken away, of a marine speed-sensing transducer assembly which may be employed in a marine speedometer of this invention;

FIG. 2 is a section substantially on the line 2—2 of FIG. 1;

FIG. 3 is a section substantially on the line 3—3 of FIG. 1;

FIG. 4 is a schematic circuit diagram of a marine speedometer of this invention, and FIG. 5 is a schematic circuit diagram of another embodiment of a signal linearizing circuit which may be employed in the speedometer of FIG. 4.

Corresponding reference characters indicate corresponding parts throughout the several views of the drawings.

DESCRIPTION OF THE PREFERRED EMBODIMENT

Referring now to FIG. 1, the marine speed sensor or transducer illustrated there employs a strut 11 which is supported on a frame which is indicated only diagrammatically at 13. The frame is adapted to be mounted on the hull of a racing sailboat with the strut 11 extending in a trailing attitude into the body of water through which the sailboat passes. The strut 11 is resiliently supported, e.g. by means of a torsion bar as indicated diagrammatically at 15 so that, as the sailboat passes through the water, the strut 11 is deflected to the left as viewed to an extent which varies as a function of the sailboat's speed. Suitable water tight seals (not shown) are provided around the resilient support.

The upper section 17 of strut 11 is of streamlined shape, as illustrated in FIG. 2, so as to reduce the strut's drag in the turbulent boundary region adjacent the ships hull while the outer section of the strut, designated 19, is of a configuration having a pointed leading edge as illustrated in FIG. 3. As is explained in greater detail in the aforesaid co-pending application, this cross-sectional configuration is highly advantageous in that it substantially eliminates vertical and lateral vibration and provides a deflection which varies as a smooth or continuous function of fluid velocity relative to the ship's hull.

The strut 11 carries a pair of shutter blades 23 and and 25 which are arranged to vary the amount of light reaching a pair of photosells, PH1 and PH2 respectively, from a suitable source (not shown). In particular, the shutter blade 23 reduces the amount of light reaching the photocell PH1 as the strut is deflected while the shutter blade 25 increases the amount of light reaching the photocell PH2. Assuming the photocells PH1 and PH2 are connected in series across a constant voltage source, the junction between the photocells will provide an output signal voltage which varies as a function of the deflection of the strut 11 and thus also as a function of the speed of the sailboat to which the sensor is attached.

As is further explained in the aforesaid co-pending application, the hydrodynamic characteristics of the strut 11 are such that the signal provided varies as a non-integer exponential function of relative fluid velocity, the exponent of the function being between 1 and 2. In the preferred embodiment the exponent is approximately 1.85.

Referring now to FIG. 4, suitable positive and negative supply voltages of equal value are provided at a pair of supply leads L1 and L2, a neutral or ground lead being indicated at L3. The photocells PH1 and PH2 are connected in series across this potential source thereby to provide at the junction between the photocells a voltage which constitutes a velocity signal and which varies as a function of fluid velocity relative to the sensing strut 11.

A reversible D.C. servomotor M1 is provided to drive the pointer 31 of a linearly calibrated speed indicator 33. Indicator 33 may, as illustrated, be calibrated in knots, having a range of twelve knots. Seromotor M1 also drives first and second linear potentiometers R1 and R2 which may, for example, be constituted by suitable multi-turn potentiometers of the so-called helipot type. Such potentiometers are preferably driven through conventional gearing so that the setting of each potentiometer is a linear function of the displacement of the servomotor.

The potentiometer R2 is connected in series with a resistor R3 having a value which is substantially equal to the total resistance of potentiometer R2 and the series connected pair (R2, R3) is connected across the supply leads L1 and L2 thereby providing at the junction between the resistances R2 and R3 a potential substantially equal to ground potential. One end of the potentiometer R1 is connected to the junction between the resistances R2 and R3 and the other end of this potentiometer is connected, through a coupling resistance constituted by a rheostat R4, to the tap of potentiometer R2. The variable voltage provided at the tap of potentiometer R1 is employed as a feedback signal which varies as a function of the displacement of the servomotor and thus also as a function of the speed value indicated on the indicator 33.

The velocity and feedback signals are applied to the input terminals of a high gain differential amplifier 35 for controlling the energization of the servomotor M1 as a function of the relative values of the velocity and the feedback signals. In other words, when the velocity signal is of higher potential than the feedback signal, the servomotor M1 is driven in one direction so as to increase the value of speed shown on the indicator 33 and, the feedback signal is of higher potential than the velocity signal, the servomotor M1 is driven in the opposite direction so as to reduce the speed value indication. From the description given thus far, it can be seen that the displacement of the servomotor and the speed indication will vary as functions of fluid velocity relative to the sensing strut 11. The operation of the potentiometers R1 and R2, together with the coupling resistance R4, is such that the indication obtained is actually a substantially linear function of fluid velocity.

If a pair of linear potentimeters are mechanically ganged so that their settings are always equal and are electrically interconnected so that they operate successively, that is, so that the output voltage from one potentiometer constitutes the supply voltage to the other, the ouput voltage from the seocnd potentiometer will vary substantially as the square of the common setting of the potentiometers, provided that the second potentiometer does not substantially load the first. However, if the second potentiometer substantially loads the first, the output voltage will vary as an approximately linear function of setting, at least for low settings of the potentiometers. In circuit of FIG. 4 the potentiometer R1 is engaged from the output voltage of potentiometer R2, being connected to the taps of potentiometer R2 through the coupling resistance R4. Since the resistance R4 is of preselectable value, the degree of loading of the potentiometer R2 may be readily varied. In this way, the extent to which the potentiometers operate successively can also be varied. Thus, the output voltage from the potentiometer R1 can be caused to closely approximate a selected non-integer exponential function of the common setting of the potentiometers. In practice the value of resistance R4 is selected to provide an exponential function in which the exponential has a value of 1.85 and which thus closely approximates the velocity signal characteristic of the speed sector or transducer illustrated in FIG. 1.

As will be understood by those skilled in the electronics art, matching the relationship of the feedback signal to the servomotor displacement with relationship of the velocity signal to the actual relative fluid velocity will calse the servomotor displacement to vary as a substantially linear function of fluid velocity. Accordingly, the indication provided by the indicator 33 will also vary as a substantially linear function of fluid velocity and thus an easily comprehended linear calibration can be employed which will provide a highly accurate indication of speed. Since feedback operation is employed, it will be also understood that the indication provided will very quickly follow changes in actual fluid velocity. Thus this marine speedometer provides a highly effective means of trimming the sails of a racing sailboat, etc.

In the embodiment as illustrated in FIG. 5, the tap of potentiometer R1 is connected to the tap of potentiometer R2 through the coupling resistance R4. With this type of connection, the output voltage from resistance R1, i.e., the feedback signal, would again vary substantially as the square of the potentiometer setting if potentiometer R1 were not substantially loaded. On the other, if the output of potentiometer R2 were heavily loaded, the output voltage would vary as a substantially linear function of potentiometer setting over most of its range. Therefore, by appropriately selecting the value of the resistance R4, the extent to which the potentiometers operate successively can be varied until the relationship between the feedback signal and the displacement of the servomotor closely approximates the non-integer exponential function which characterizes the velocity signal output voltage obtained from the velocity sensor of FIG. 1.

In view of the above, it will be seen that several objects of the present invention are achieved and other advantageous results are attained.

As various changes could be made in the above constructions without departing from the scope of the invention, it is intended that all matter contained in the above description or shown in the accompanying drawings shall be interpreted as illustrative and not in a limiting sense.

What is claimed is:
1. A marine speedometer comprising:
   a hydrodynamic transducer which provides a velocity signal which varies as an exponential function of relative fluid velocity, the exponent of said function being between one and two;
   a servomotor for driving a linearly calibrated speed indicator;
   first and second linear potentiometers;
   means for driving each of said potentiometer from said servomotor, the setting of each potentiometer being a linear function of the displacement of said servomotor;
   a coupling resistance of preselectable value;
   means interconnecting said first and second linear potentiometers and said coupling resistance in a circuit wherein the extent to which said potentiometers operate successively is variable as a function of the value of said coupling resistance thereby to provide a feedback signal which varies substantially as an exponential function of the displacement of said servomotor, which function closely approximates the velocity signal function which is characteristic of said transducer; and
   an amplifier for selectively energizing said servomotor as a function of the relative values of a pair of signals applied thereto; and means for applying said velocity and feedback signals to said differential amplifier for controlling the energization of said servomotor whereby the displacement of said servomotor is varied as a substantially linear function of relative fluid velocity.

2. A speedometer as set forth in claim 1 wherein one end of said first potentiometer is connected to one end of said second potentiometer and the other end of said first potentiometer is connected to the top of said second potentiometer through said coupling resistance and wherein said feedback signal is provided at the tap of said first potentiometer.

3. A speedometer as set forth in claim 1 wherein one end of said first potentiometer is connected to one end of said second potentiometer and the tap of said first potentiometer is connected to the tap of said second potentiometer through said coupling resistance and wherein said feedback signal is provided at the other end of said first potentiometer.

4. A speedometer as set forth in claim 1 wherein said transducer comprises a pair of photocells and means for oppositely varying the amounts of light reaching the photocells as a function of relative fluid velocity.

5. A speedometer as set forth in claim 4 wherein said photocells are connected in series across a voltage source thereby to provide said velocity signal at the junction between the photocells.

6. A speedometer as set forth in claim 5 wherein said transducer comprises a drage strut having a pointed leading edge thereby providing at said junction a velocity signal voltage which varies as an exponential function of relative fluid velocity, the exponent of said function being approximately 1.85.

7. A marine speedometer comprising:

a hydrodynamic transducer which provides a velocity signal which varies as an exponential function of relative fluid velocity, the exponent of said function being between one and two;

a servomotor for driving a linearly calibrated speed indicator;

first and second linear potentiometers;

means for driving each of said potentiometer from said servomotor, the setting of each potentiometer being a linear function of the displacement of said servomotor;

means interconnecting said first and second linear potentiometers to energize said second potentiometer from the output voltage provided at the tap of said first potentiometer, said means including a coupling resistance of preselectable value for varying the loading of said first potentiometer thereby to provide from said second potentiometer a feedback signal which varies substantially as a exponential function of the displacement of said servomotor, which function closely approximates the velocity signal function which is characteristic of said transducer; and a differential amplifier for selectively energizing said servomotor as a function of the relative values of a pair of signals applied thereto; and means for applying said velocity and feedback signals to said differential amplified for controlling the energization of said servomotor whereby the displacement of said servomotor is varied as a substantially linear function of relative fluid velocity.

References Cited

UNITED STATES PATENTS

| 1,955,502 | 4/1934 | Kenyon | 73—186 |
| 3,287,968 | 11/1966 | Kenyon | 73—186 |

DONALD O. WOODIEL, Primary Examiner